United States Patent
Liu et al.

(10) Patent No.: US 11,677,560 B2
(45) Date of Patent: Jun. 13, 2023

(54) UTILIZATION OF A MEMORY DEVICE AS SECURITY TOKEN

(71) Applicant: Micron Technology, Inc., Boise, ID (US)

(72) Inventors: Zhan Liu, Cupertino, CA (US); Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 17/196,217

(22) Filed: Mar. 9, 2021

(65) Prior Publication Data

US 2022/0294632 A1   Sep. 15, 2022

(51) Int. Cl.
| | | |
|---|---|---|
| *H04L 9/32* | (2006.01) | |
| *H04L 9/08* | (2006.01) | |
| *H04L 9/30* | (2006.01) | |
| *G06F 13/16* | (2006.01) | |

(52) U.S. Cl.
CPC ............ *H04L 9/3234* (2013.01); *G06F 13/16* (2013.01); *H04L 9/083* (2013.01); *H04L 9/30* (2013.01); *H04L 9/3247* (2013.01); *H04L 9/3263* (2013.01)

(58) Field of Classification Search
CPC ......... H04L 9/3234; H04L 9/083; H04L 9/30; H04L 9/3247; H04L 9/3263; G06F 13/16
See application file for complete search history.

(56) References Cited

U.S. PATENT DOCUMENTS

| | | | | |
|---|---|---|---|---|
| 2010/0023757 | A1* | 1/2010 | Nguyen-Huu | H04L 9/083 380/282 |
| 2017/0288867 | A1* | 10/2017 | Collier | G06F 21/602 |
| 2017/0338961 | A1* | 11/2017 | Cho | H04L 9/3242 |
| 2018/0114226 | A1* | 4/2018 | Desai | G06Q 20/40145 |
| 2019/0068381 | A1* | 2/2019 | Takemori | H04L 9/3268 |
| 2019/0102576 | A1* | 4/2019 | Pope | G06F 21/602 |
| 2020/0387859 | A1* | 12/2020 | Chen | H04L 9/0825 |
| 2022/0052849 | A1* | 2/2022 | Kasso | H04L 9/0825 |
| 2022/0122088 | A1* | 4/2022 | Desai | H04L 9/3231 |
| 2022/0131839 | A1* | 4/2022 | Potter | G06F 21/85 |
| 2022/0278842 | A1* | 9/2022 | Kasso | H04L 67/08 |
| 2022/0377553 | A1* | 11/2022 | Lee | H04L 9/08 |

FOREIGN PATENT DOCUMENTS

| | | | | |
|---|---|---|---|---|
| WO | WO-2013093209 A1 | * | 6/2013 | ......... G06F 21/575 |
| WO | WO-2020033428 A1 | * | 2/2020 | ......... G06F 11/1004 |

* cited by examiner

*Primary Examiner* — Darshan I Dhruv
(74) *Attorney, Agent, or Firm* — Greenberg Traurig

(57) ABSTRACT

Disclosed are methods for utilizing a memory device as a security token. In one embodiment, a method includes receiving a request to perform an operation; transmitting a nonce to a memory device; receiving a second nonce from the memory device, the second nonce encrypted using a private key of the memory device; verifying the second nonce using a public key of the device, held by the host system; and executing the operation upon successfully verifying the second nonce.

16 Claims, 6 Drawing Sheets

UTILIZATION OF A MEMORY DEVICE AS SECURITY TOKEN

TECHNICAL FIELD

At least some embodiments disclosed herein relate to authentication in general, and more particularly, but not limited to authentication of a communication endpoint having a secure memory device in a service network.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

In the illustrated embodiment, a memory device can be configured to function as a security token for the operation of a computing system, such as a computer, an SSD, or similar device. During a registration process, the public key of the memory device is stored into the computing system to indicate that the owner of the memory device is authorized to use the memory device. Subsequently, when the computing system is about to the perform an operation that requires the authentication of the user, the computing system checks whether such a memory device is present and connected. For example, the computing system can be connected to the security token of the current owner or authorized user to store the public key of the next owner/authorized user into the computing system. For example, when there is no authorized security token being connected to the computing system, the computing system may operate in a factory mode to connect to a central server. The server may identify the owner/authorized user to the computing system over a computer network.

Figure 1:
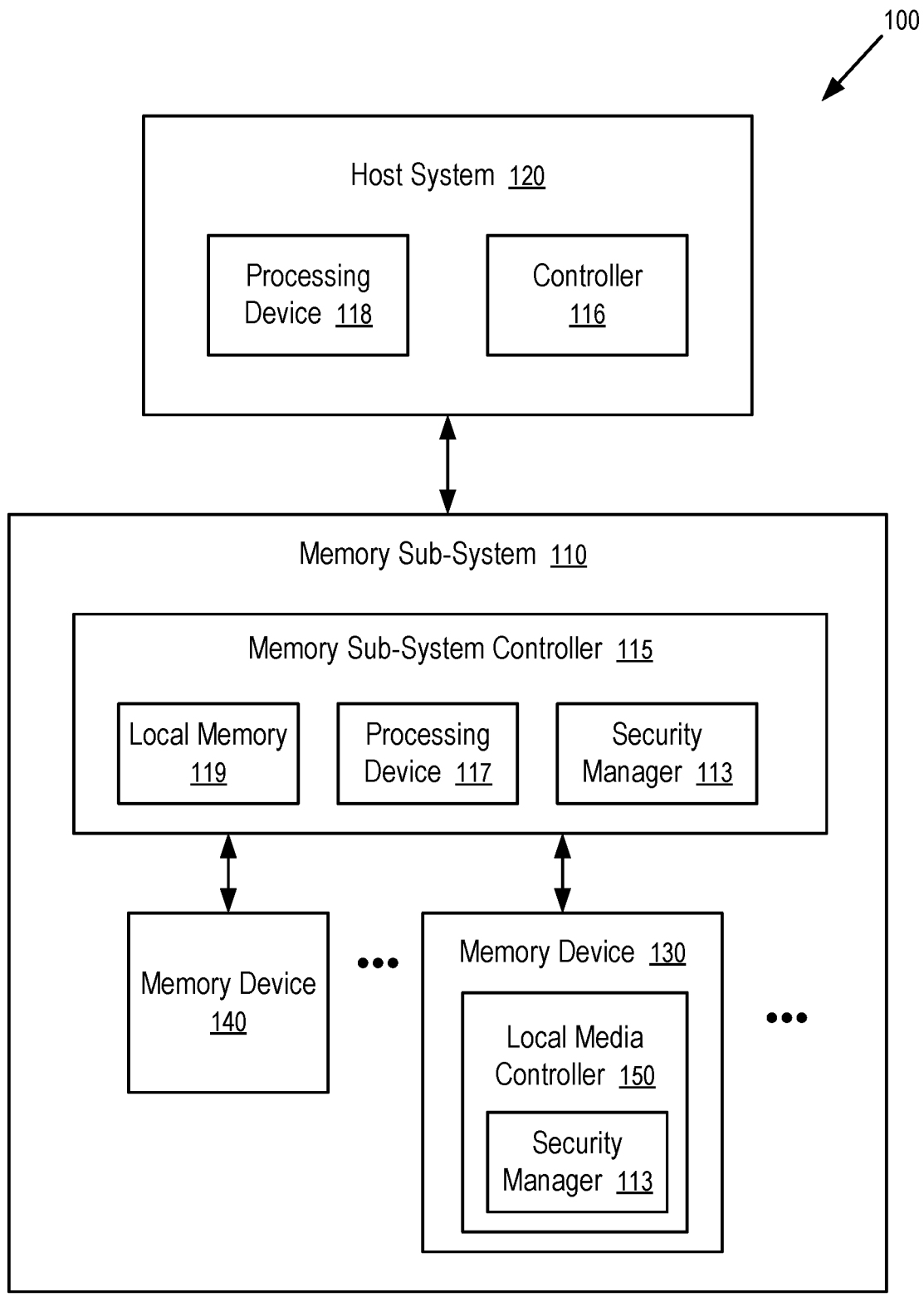
FIG. 1 illustrates an example computing system having a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to generate a certificate that can be used to authenticate that the computing system 100, as an endpoint in a computer network, has a particular combination of the memory device 130 with one or more other components. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip included in the memory sub-system 110. In other embodiments, the security manager 113 can be part of firmware of the memory sub-system 110, an operating system of the host system 120, a device driver, or an application, or any combination therein.

For example, the security manager 113 can determine a cryptographic hash value of a set of instructions to be executed during boot time of the computing system 100. The security manager 113 can check the integrity of the set of instructions by comparing the hash value computed at the boot time with a pre-calculated hash value. If the hash values agree with each other, the set of instructions can be considered to have not been tampered with and/or corrupted. Thus, the set of instructions can be executed in the computing system 100 to further implement the security operations of the security manager 113 and/or the boot operations of the computing system 100. Optionally, the verification of the hash value can be part of the authentication of the computing system 100 as an endpoint using a certificate generated through the execution of at least a portion of the set of instructions during the boot time of the computing system 100.

For example, an identifier of the memory device 130 can be generated based at least in part on the hash value of the set of instructions. Thus, when the identifier of the memory device 130 is authenticated through the verification of the certificate, the hash value of the set of instructions can be considered to have been verified as correct; and the set of instructions used to generate the certificate and to boot up the computing system 100 has not been tampered with and/or corrupted.

The execution of the set of instructions in the computing system 100 causes the computing system 100 to determine the identifies of other components of the computing system 100, such as an identifier of the processing device 118, an identifier of the controller 116, an identifier of the memory sub-system controller 115, an identifier of the memory device 140, and/or an identifier of a software program (e.g., an operating system, a device driver, an application program, etc.). The set of identifiers of the components in the computing system 100 having the memory device 130, including the identifier of the memory device 130, can be combined to generate a cryptographic key for the signing of a certificate. The certificate may include a monotonically increasing counter value that increases every time the computing system 100 is booted up and/or every time the memory device 130 performs a secure operation.

The certificate can be communicated with a remote computer over a computer network for authentication. In some embodiments, the host device can further confirm the identity of the memory device via a challenge-response protocol. In these embodiments, the host device generates and issues a challenge to the memory device (e.g., a random or pseudo-random value). The memory device signs the challenge with its private key and returns the signed value. The host device can then confirm the signature using the correspond public key of the memory device. If the signatures match, the host device can confirm the memory device's identity. When the certificate is authenticated and the memory device's identity is confirmed, it can be concluded that the integrity of the set of instructions used to generate the certificate is intact, and the computing system 100 has the memory device 130 in combination with the set of components represented by the identifiers used to generate the cryptographic key that is used to sign the certificate. Additionally, the monotonic counter value included in the certificate allows its recipient to verify that it was generated recently, and thus that it can be trusted.

Figure 2:
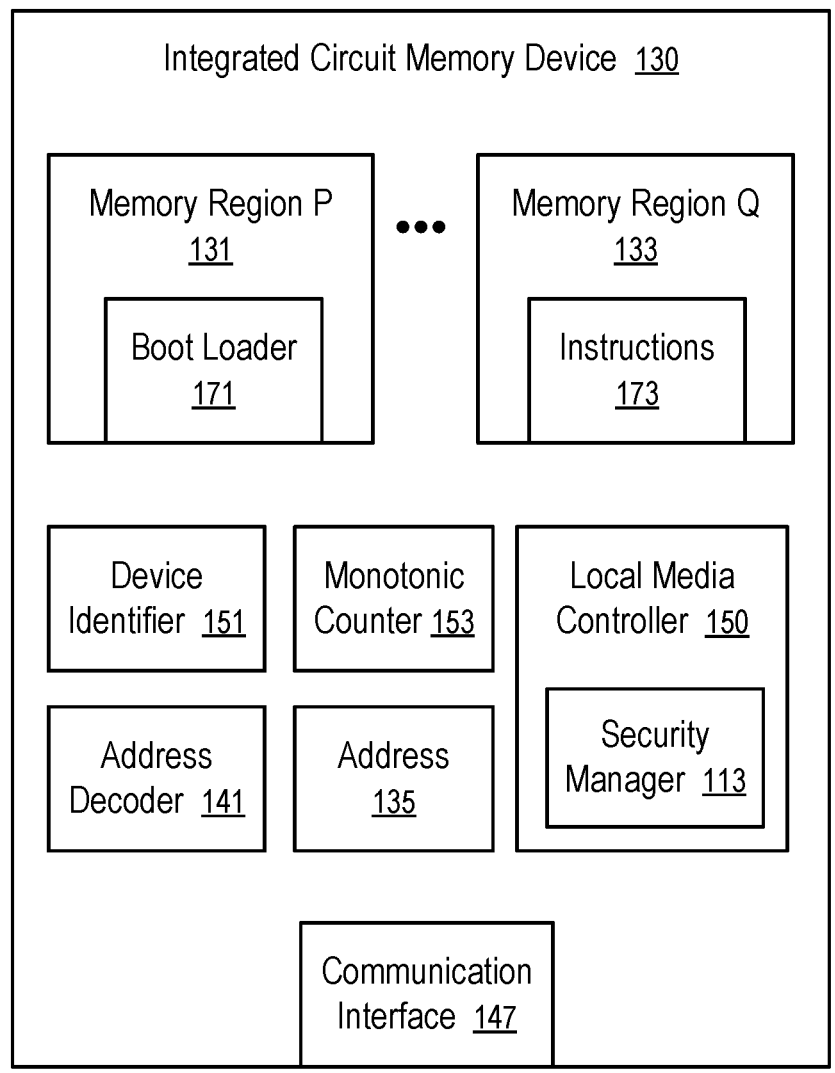
FIG. 2 illustrates an integrated circuit memory device having a security manager according to one embodiment.

FIG. 2 illustrates an integrated circuit memory device having a security manager according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can control access to a memory region 131 based on a cryptographic key that is generated based on a secret of the integrated circuit memory device 130 and/or a cryptographic key representative of an owner or an authorized user of the memory device 130. When a request to write data into the memory region 131 is received in the integrated circuit memory device 130, the security manager 113 can verify whether the request can be permitted based on whether the requester is in possession of the cryptographic key. For example, the requester may digitally sign the request, or a challenge message, using the cryptographic key to indicate that requester has the permission to write data into the memory region 131.

The integrated circuit memory device 130 has a communication interface 147 to receive a command having an address 135 from the controller 115 of a memory sub-system 110. In response to the address 135 identifying a memory region 131 that requires access control, the security manager 113 performs cryptographic operations to verify that the request is from a requester having the cryptographic key authorized for the access to the memory region 131, before providing memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

For example, the memory region 131 can store a boot loader 171. At boot time, the security manager 113 can measure the boot loader 171 by computing a cryptographic hash value of the boot loader 171. The cryptographic hash value of the boot loader 171 can be used to generate a device identifier 151 of the integrated circuit memory device 130. The boot loader 171 (and/or an operating system or a device driver, or a security application) can include instructions to implement a portion of the security manager 113. During the boot time, the instructions can determine the configuration of the computing system 100 in which the integrated circuit memory device 130 is a component.

For example, the configuration of the computing system 100 of FIG. 1 can include the major software/firmware components of the memory sub-system 110. The software/firmware can be stored in other memory devices (e.g., 140), or in the memory device 130 in a memory region 133. For example, the instructions 173 in the memory region 133 in the integrated circuit memory device 130 can include the operating system of the computing system 100, device drivers, firmware, and/or software applications. Some of the major software/firmware components of the memory sub-system 110 can be stored outside of the memory region(s) under the access control of the security manager 113 and/or outside of the integrated circuit memory device 130. The identifiers of the software/firmware components can include component identifications, version numbers, serial numbers, and/or cryptographic hash values of the software/firmware components.

The configuration of the computing system 100 of FIG. 1 can include the major hardware components of the memory sub-system 110, such as the processing device 118 and/or the controller 116. The host system 120 can further include peripheral devices, such as a network interface card, a communication device, another memory sub-system, etc. The identifiers of the hardware components can include serial numbers, addresses, identification numbers, etc.

The configuration information of the computing system 100, including the device identifier 151 can be used to generate a cryptographic key to sign a certificate generated using at least the value from a monotonic counter 153. The security manager 113 is configured to increase the monotonic counter 153 for each use of the boot loader 171 to start the computing system 100 in which the memory device 130 is configured.

Figure 3:
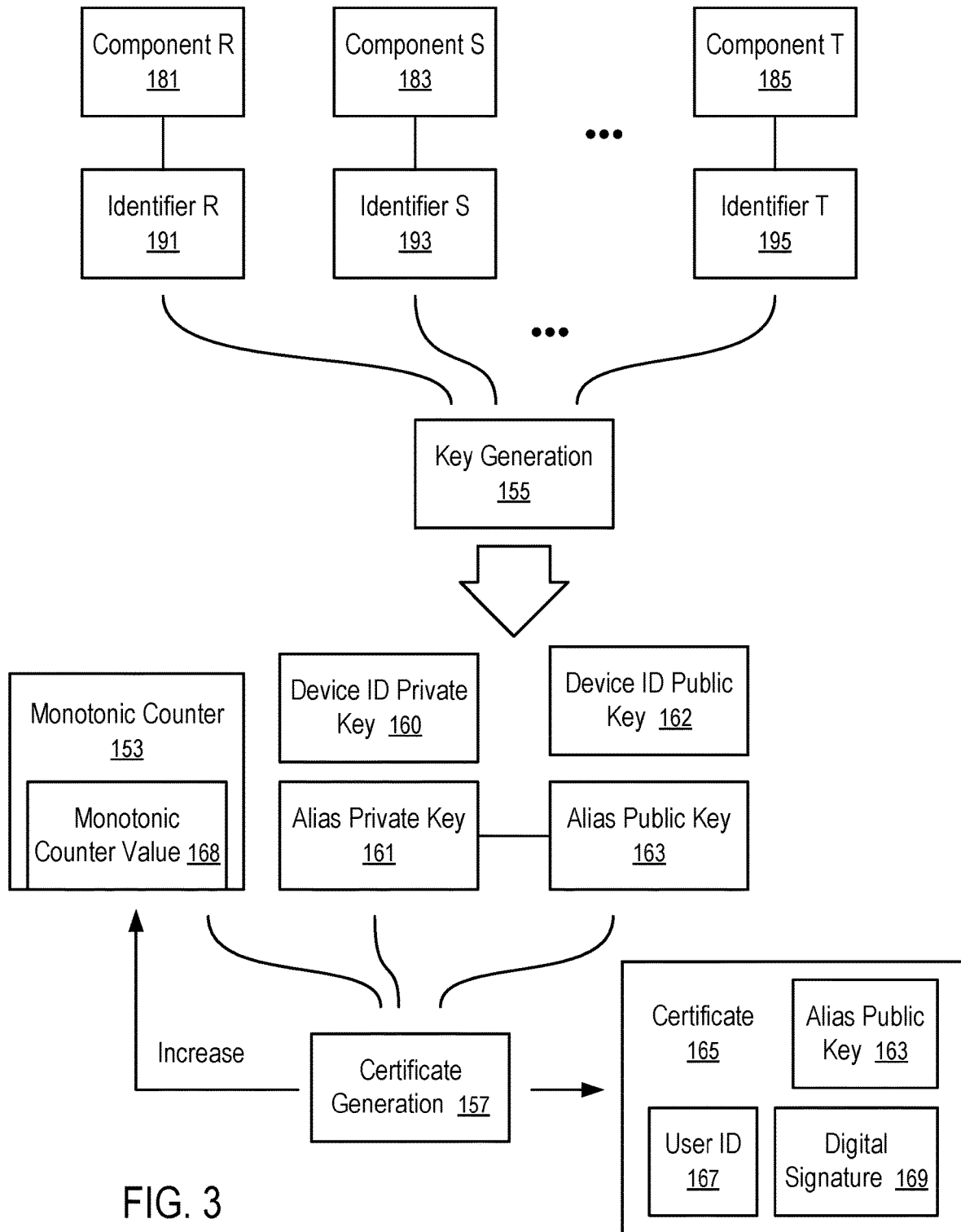
FIG. 3 illustrates the generation of a certificate for endpoint authentication according to one embodiment.

FIG. 3 illustrates the generation of a certificate for endpoint authentication according to one embodiment. For example, the security manager 113 illustrated in FIGS. 1 and/or 2 can generate a certificate using the technique of FIG. 3 at boot time of a computing system 100.

In FIG. 3, a computing system 100 has a set of components 181, 183, ..., 185. The components 181, 183, ..., 185 can include software components and/or hardware components. The components 181 to 185 can have corresponding identifiers 191, 193, ..., 195. For example, a component S 183 can be a software component having an identifier S 193; and a component T 185 can be a hardware component having a separate identifier T 195.

An identifier of a component identifies at least some unique aspects of the component. In some instances, an identifier can uniquely identify a component among similar components having the same or similar functions. For example, an identifier of a software component can include or be based on a cryptographic hash value of the software component and/or a serial number of the software component. For example, an identifier of a hardware component can be based on a type, a description, a serial number, and/or an address of the hardware component.

An operation of key generation 155 is performed to obtain a first pair of a device ID private key 160 and a device ID public key 162 and a second pair of an alias private key 161 and an alias public key 163. In one embodiment, a physical unclonable function (PUF) may be used to generate a symmetric key on the device. This PUF may comprise an SRAM PUF, Delay PUF, or any other PUF technology implemented on the device. A PUF generally generates a digital fingerprint given a set of physical characteristics of a semiconductor device. Thus, the digital fingerprint is uniquely associated with each circuit used to generate the PUF. When implemented in a memory device, the PUF generates a unique identifier for the memory device based on the presence of the circuit in the memory device. Using this symmetric key, the device can generate a symmetric key using a symmetric key algorithm. In one embodiment, a symmetric key algorithm takes the digital fingerprint as an input and outputs the symmetric key. Since the PUF is tied to the circuity generating the value, the PUF can be regenerated at any moment and need not be stored in volatile memory. It thus follows that the symmetric key can be regenerated consistently at any time and is not required to be stored.

The symmetric key can then be used to generate an asymmetric key pair. Similar to symmetric key generation, an asymmetric key is generated using a large random number as an input. In the illustrated embodiment, the symmetric key is used as this input and thus is used to generate the asymmetric key pairs. Since the digital fingerprint and symmetric key can be generated consistently and repeatedly at will, it thus follows that the asymmetric key pair can be generated in the same manner. Using asymmetric cryptography, ciphertext generated using the alias private key 161 can be decrypted using the alias public key 163; and ciphertext generated using the alias public key 163 can be decrypted using the alias private key 161. Since it is very difficult to determine the alias private key 161 from the alias public key 163, revealing the alias public key 163 would not compromise the secrecy of the alias private key 161.

In some embodiments, the memory device 130 may additionally include program logic and/or hardware for performing other cryptographic operations. In one embodiment, this program logic and/or hardware may be implemented as a crypto co-processor 199 in the memory device 130. In some embodiments, crypto co-processor 199 may be implemented in a memory sub-system 110 alternatively, or in addition to, implemented in the memory device 130. In one embodiment, these operations include the generation of a symmetric key as described above. Alternatively, or in conjunction with the foregoing, the memory device 130 may additionally include program logic and/or circuitry to perform a Diffie-Hellman (DH) key exchange (e.g., an Elliptic Curve DH, ECDH, exchange) with another device. In one embodiment, the other device may comprise host system 120. In another embodiment, the other device may comprise server 201. In some embodiments, the memory device 130 may exchange keys with both devices. In some embodiments, the memory device 130 and/or sub-system 110 includes circuity (e.g., network transceiver) for communicating with a remote computing device. Alternatively, the memory device 130 and/or sub-system 110 may utilize an external network interface via, for example, an intermediary device such as host system 120

In one embodiment, the ECDH key exchange may use key pair 160, 162 or key pair 161, 163. A remote device (e.g., 120 or 201) may include its own public-private key pairs. In some embodiments, one or both devices may generate new public/private key pairs (referred to as public_key and private_key) to use in an ECDH exchange. Derivation of these keys based on a PUF is described above and not repeated herein. The server or host system may utilize any public/private key-pair as desired.

In an ECDH key exchange, both devices generate random key-pairs using the private key of the key-pair and an ECC elliptic curve with generator point G. Specifically, [public_random, private_random]=private_key*G. The devices can then exchange public_random keys over an insecure network (and, for example, via an intermediary device such as host system 120). Each device independently generates a shared key based on the public_random key and the device's private_key: shared_key=public_random*private_key. In some embodiments, this shared key may be used as the shared key or as an input into another cryptographic primitive (e.g., hash function) to generate a derived key. In this manner, the memory sub-system 110 and a remote endpoint can share secret key without exposing secret data to intermediary devices, such as a host system 120.

An operation of certificate generation 157 is performed to generate a certificate 165 that contains a digital signature 169 signed using the device ID private key 160. The certificate 165 contains data to be signed, including the alias public key 163 and the current monotonic counter value 168. A side-effect of the certificate generation 157 is increasing the value 168 of the monotonic counter 153.

Optionally, the certificate 165 can include a user ID 167, such as a name, an email address, a registered user name, or another identifier of an owner or authorized user of the computing system 100 in which the certificate 165 is created.

Optionally, the certificate 165 can include some of the identifiers 191 to 195 and/or the value of the monotonic counter 153.

Optionally, some of the information provided via the certificate can be in an encrypted form. For example, the information can be encrypted using a public key of a server that is authorized to access the encrypted information, such as a server that is configured to authenticate the digital signature 169.

The security manager 113 is configured to generate a certificate 165 during each instance of booting up the computing system 100 using the boot loader 171 secured in the memory device 130. A certificate 165 generated based on a higher value of the monotonic counter 153 invalidates the certificates generated user lower values of the monotonic counter 153. The remote host will refuse any certificate with lower monotonic counter value than the one used for the last successful connection.

Preferably, after the certificate 165 is generated, the device ID private key 160 is purged from the computing system 100 and the memory device 130. A set of instructions protected by the security manager 113 can be executed to use the certificate 165 generated at the boot time to authenticate the computing system 100 as an endpoint in a computer network. A remote server having the device ID public key 162 can verify that digital signature 169 and the configuration of the computing system 100 as identified by the identifiers 191 to 195 used in the key generation 155.

Figure 4:
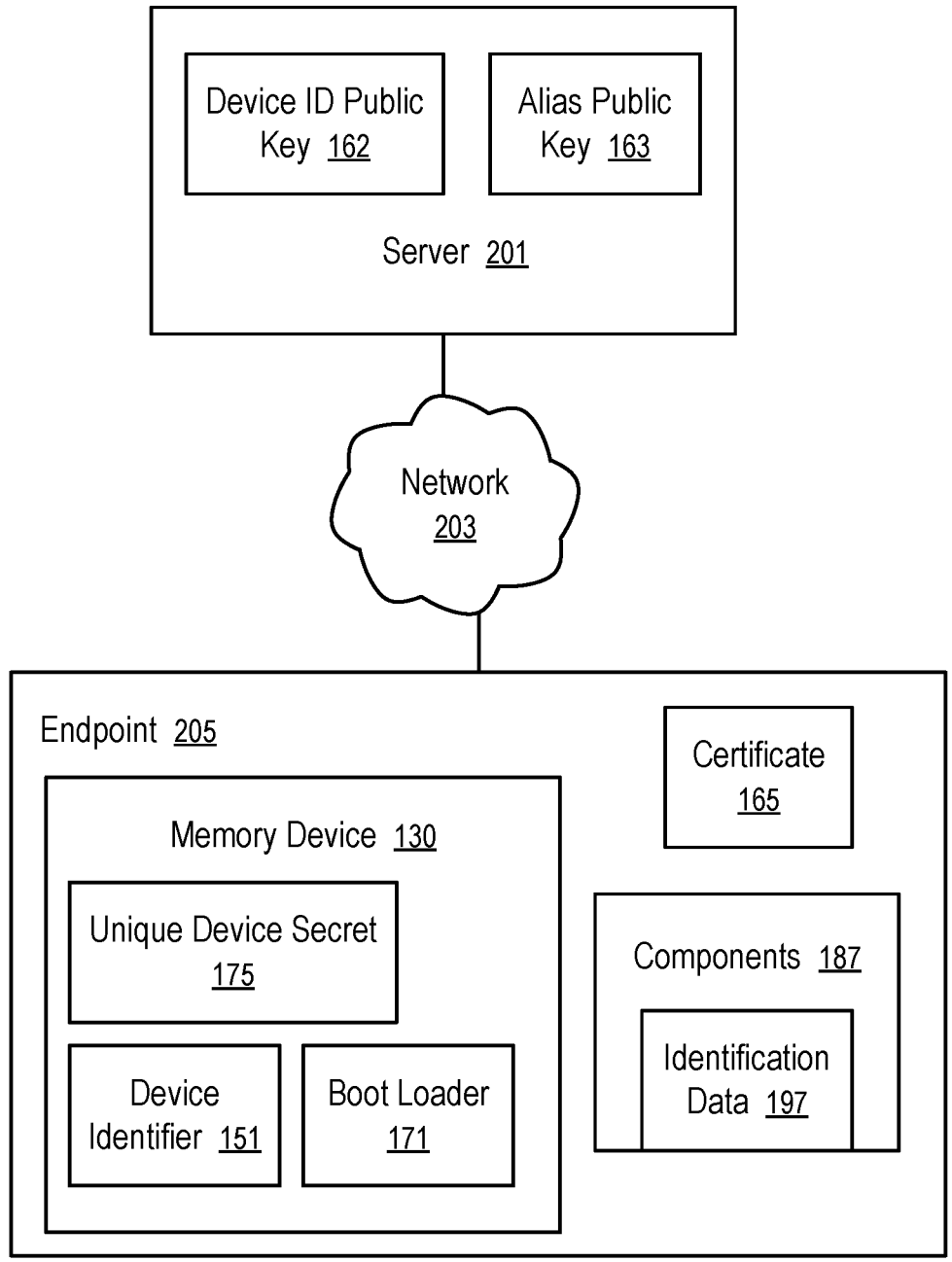
FIG. 4 illustrates the use of a certificate for endpoint authentication according to one embodiment.

FIG. 4 illustrates the use of a certificate for endpoint authentication according to one embodiment. For example, an endpoint 205 in FIG. 4 can be a computing system 100 of FIG. 1 having a security manager 113 configured in the integrated circuit memory device 130 of FIG. 2. The authentication can be performed using a certificate 165 generated using the technique of FIG. 3.

In FIG. 4, the endpoint 205 includes a memory device 130 that has a unique device secret 175. A device identifier 151 of the memory device 130 can be generated using a unique device secret 175 and a cryptographic measure of the boot loader 171. For example, the cryptographic measure of the boot loader 171 can be obtained by reading the boot loader 171 prior to its execution and applying a cryptographic hash function to the boot loader 171 to obtain a cryptographic hash value of the boot loader 171 that is to be executed.

The endpoint 205 has additional components 187 that have identification data 197. The combination of the device identifier 151 and the identification data 197 can be used to generate a certificate 165 in a way as illustrated in FIG. 3.

A server 201 connected to the endpoint 205 via a computer network 203 is provisioned to contain the device ID public key 162 corresponding to the device ID private key 160 used to sign the certificate 165. The server 201 can determine whether the certificate 165 is valid by decrypting the digital signature 169 using the device ID public key 162.

For example, when the memory device 130 is initially used in the endpoint 205 to boot up the endpoint 205, the endpoint 205 can register its identity with the server 201 by providing the device ID public key 162. The registration operation can include the storing of the device ID public key 162 to indicate that an endpoint 205, having a certificate verifiable via the device ID public key 162, is an authorized user. The device ID public key 162 can be associated with an identification of an owner and/or an authorized user of the endpoint 205.

The certificate 165 includes the value 168 of the monotonic counter 153 at the time of booting up the endpoint 205.

Optionally, the certificate 165 can include some of the identifiers 191 to 195 used to generate the alias private key 161, the alias public key 163, the device ID private key 160, and the device ID public key 162.

In some embodiments, the server 201 has a copy of the unique device secret 175. For example, the memory device 130 can be registered in a manufacturing facility of memory device 130 such that the device identifier 151 can be regenerated independently in a secure server (e.g., 201). When the server 201 receives the additional identifiers (e.g., 193 to 195, such as the identification data 197) from the endpoint 205, the secure server (e.g., 201) can independently compute the public key 163 for the authentication of the digital signature 169. Optionally, the certificate 165 can include the additional identifiers (e.g., 193 to 195, such as the identification data 197). Thus, when some of the components 187 have been replaced, the server 201 can determine whether to accept the change to the endpoint 205 or to require further verification that the endpoint 205 is legitimated and/or associated with a known owner or an authorized user.

For example, a set of instructions secured via the memory device 130 can be executed in the endpoint 205 to communicate the certificate 165 from the endpoint 205 to the server 201 for authentication. The certificate 165 of the endpoint 205 is generated at the time of booting up the endpoint 205 to represent the configuration of the endpoint 205 via the set of identifiers 191 to 195. After verifying that the certificate 165 is generated using the device ID private key 160 that represents the identifiers 191 to 195, the server 201 can determine whether the endpoint 205 having the configuration is permitted to operate and/or receiver services. In some instances, the server 201 can allow the endpoint 205 to replace certain components and/or have a replacement frequency below a threshold to pass authentication. Based on the response, the endpoint 205 can prompt the user to register, to demonstrate ownership or authorization to use, or to shut down.

Optionally, the server 201 can track the highest value of the monotonic counter 153 of the endpoint 205 as seen in the certificates from the endpoint 205 and/or the memory device 130. A certificate generated based on a counter value equal to or lower than the latest counter value used in a successful connection of one endpoint 205 to the server 201 can be described as obsolete. Endpoints 205 presenting an obsolete certificate will not be granted access to servers 201.

In some embodiments, the server 201 has a copy of the alias public key 163. When establishing a connection with the endpoint 205, and after verifying the certificate 165 has a valid digital signature 169 and a not-obsolete monotonic counter value 168, the server 201 may verify the alias public key 163 portion of the certificate. If the alias public key 163 stored in the server 201 and the alias public key 163 included in the certificate 165 do not match, then a connection with the endpoint 205 may not be allowed. This check can be used to prevent attacks where the malicious actor is able to steal the alias private key 161 from a valid device and use it on a device with a compromised identifier (e.g., one of device identifiers 151, 191, 193, . . . , 195). If the keys match, then the alias private key 161 available at runtime on the endpoint 205 may be used to sign content that may be verified by the server 201.

For example, as part of a connection establishment procedure, the server 201 may issue a challenge to the endpoint 205, which signs the response with the alias private key 161 and sends it back to the server 201. The server 201 may then use its copy of the alias public key 163 and verify that the challenge was signed by a valid endpoint 205.

Figure 5:
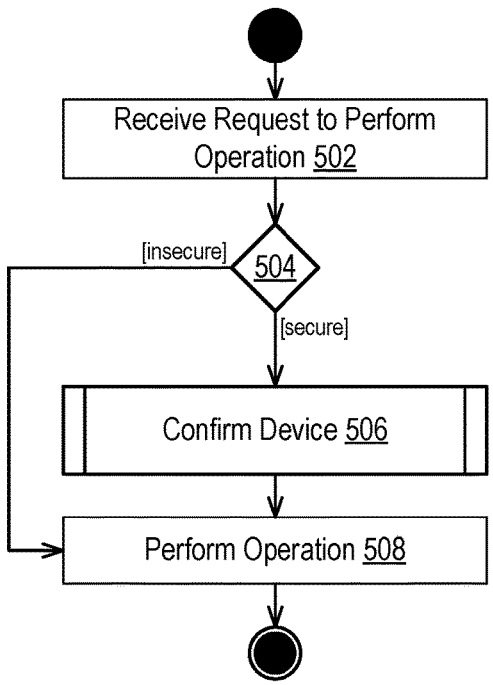
FIG. 5 is a flow diagram illustrating a method for performing a secure operation on a computing device using a memory device as a security token according to some embodiments of the disclosure.

FIG. 5 is a flow diagram illustrating a method for performing a secure operation on a computing device using a memory device as a security token according to some embodiments of the disclosure. In the illustrated embodiment, the method can be executed by a computing system.

In block 502, the method receives a request to perform an operation. In some embodiments, the request is received from a computing system such as a desktop, laptop, or mobile computing device. In other embodiments, the request may be received from a component of such a device (e.g., an SSD). The request may be in the form of a system call or a higher-level request such as an HTTP request. In one embodiment, the operation may comprise a login request to the computing system. In general, any request for data may be received in block 502.

In block 504, the method determines if the request requires authentication or not. In some embodiments, the method may perform any insecure or non-authenticated requests in block 508. Alternatively, if the request requires authentication, the method proceeds to block 506.

In block 506, the method confirms the user identity by confirming that a memory device is connected to the computing system. Details of block 506 are provided in FIG. 6 and only briefly described herein.

In the illustrated embodiment, a computing system may be configured with a public key. This public key may be associated with a particular user or entity. In some embodiments, the public key may be stored by a key management server (KMS) and distributed by the KMS. Thus, in some embodiments, the computing system acquires a public key from the KMS. However, no limitations are placed on how a computing system obtains a public key. Indeed, in many scenarios, public keys are freely distributed.

When the computing system determines that a request requires authentication in step 504, it first determines if a public key exists. If no such key exists, the method fails since it cannot authenticate the request (as will be discussed, the method cannot verify data returned from a memory device if the public key is not available). Alternatively, the method may revert to a factory reset mode upon detecting a missing public key, described more fully in FIG. 8. In some embodiments, the public key is stored in a well-defined location of the computing system (e.g., in a designated location on a file system or in dedicated hardware).

In the illustrated embodiments, a memory device is configured to store a corresponding private key, as described in previous Figures. In the illustrated embodiment, this private key corresponds to the public key discussed above and thus forms a public-private key pair. The private key is stored securely in the memory device and is not accessible by the computing system. In some embodiments, a key-pair associated with the memory device may be updated by secure communications with the KMS. The specific details of the key population on the memory device have been described previously and are not repeated herein. In brief, the memory device may be configured to store a private key in a secure (i.e., inaccessible) storage location. The private key may be updated using a secure protocol such as that described in commonly-owned U.S. application Ser. Nos. 17/014,203, 17/014,206, and 17/014,215, each of which was filed on Sep. 8, 2020 and all of which are incorporated herein by reference in their entirety.

In the illustrated embodiment, the computing device can authenticate a user by determining that the proper memory device is attached to the computing device. Details of this process are described more fully in FIG. 6.

Once the computing system checks the device, in block 508, it performs the requested operation. In one embodiment, the operation may comprise a lower-level system operation (e.g., accessing a memory device, writing to non-volatile storage, etc.). In other embodiments, the operation may comprise issuing a network request or enabling a feature of a graphical user interface (GUI). In the illustrated embodiment, the method will only perform secure operations in block 508 if it can confirm that a proper memory device is connected to the system in block 506.

Figure 6:
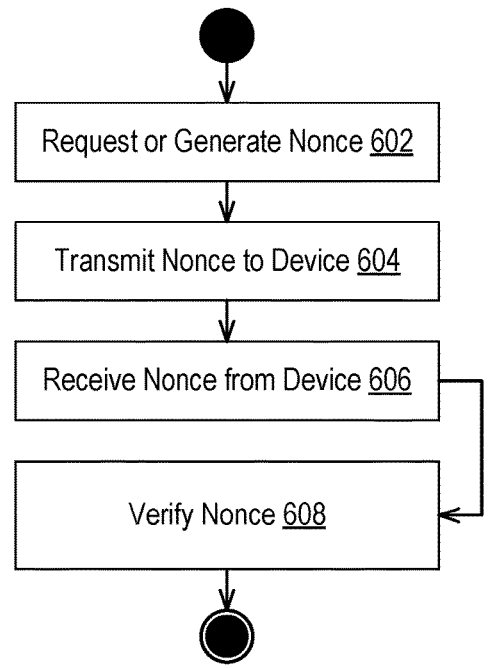
FIG. 6 is a flow diagram illustrating a method for confirming a memory device according to some embodiments of the disclosure.

FIG. 6 is a flow diagram illustrating a method for confirming a memory device according to some embodiments of the disclosure. In the illustrated embodiment, the method can be executed by a computing system.

In block 602, the method requests or generates a nonce. In one embodiment, a nonce comprises any sequence of alphanumeric data. In some embodiments, the nonce may comprise a monotonic counter value. In some embodiments, the nonce may include a timestamp.

In one embodiment, the method may request the nonce from the memory device. In this embodiment, the computing system issues a command to the memory device to retrieve a nonce value. In these embodiments, the method may sign the request for a nonce value prior to issuing the request. In another embodiment, the method may generate the nonce value independent of the memory device. In some embodiments, the nonce value comprises a random or pseudo-random value. In either scenario, after the completion of block 602, the method obtains a nonce value. In some embodiments, the nonce may alternatively comprise a timestamp, monotonic counter value, or other type of pseudo-random value. In some embodiments, various pseudo-random values may be combined to form a nonce (for example, a timestamp combined with a monotonic counter value).

In block 604, the method transmits the nonce to the memory device. In some embodiments, the method may sign the message that includes the nonce. In other embodiments, the message may be unsigned. In one embodiment, the method communicates with the memory device over an interface. In some embodiments, this interface is a Serial Peripheral Interface (SPI) interface.

In block 606, the method receives a returned nonce from the memory device. In the illustrated embodiment, the returned nonce may be received by a computing system over the same interface (e.g., an SPI interface). In the illustrated embodiment, the nonce comprises a ciphertext generated based on the nonce transmitted in block 604. In this embodiment, the memory device generates the ciphertext using a public key stored by both the memory device and the host processor. Thus, in block 606, the method stores both an unencrypted nonce and the ciphertext corresponding to the unencrypted nonce.

In some embodiments, block 606 can additionally include receiving a signature generated using the nonce and in these embodiments the nonce may or may not be encrypted as discussed above. In these embodiments, the signature may be generated using a private key stored by the memory device. In some embodiments, the nonce may be unencrypted and only a signature signed using the private key may be used. As will be discussed further herein, in one embodiment, the methods of FIG. 6 and FIG. 7 may eschew encryption of nonce values and utilize digital signatures to verify nonce values. In these embodiments, larger nonce values may be used to avoid time-consuming encryption/decryption algorithms being applied to nonce values. Thus, rather than encrypting and decrypting the nonce in blocks 608 and 704 of FIGS. 6 and 7, respectively, the method may instead generate and verify digital signatures. Certainly, in some embodiments, both techniques may be used simultaneously.

In block 608, the method verifies the nonce.

In one embodiment, the nonce may be encrypted using the public key shared by the memory device and the host processor. In these embodiments, the method may further include decrypting the nonce. In the illustrated embodiment, various asymmetric encryption algorithms may be used, including, but not limited to, an Elliptic-curve Diffie-Hellman (ECDH) algorithm. In the illustrated embodiment, the method reads the public key stored on the computing system and decrypts the nonce. In the illustrated embodiment, the method compares the decrypted value to the nonce requested or generated in block 602. If the values match, the method confirms the memory device. That is, the method confirms that the memory device has the same public key corresponding to the computer system's public key, and thus a challenge-response protocol was successful. Alternatively, if the method determines that the decrypted nonce is not equal to the nonce requested or generated in block 602, the method raises an error.

In some embodiments, if the nonce includes a signature, block 608 further includes verifying the signature. In this embodiment, the method retrieves the public key of the memory device and verifies the signature of the nonce sent by the memory device. As discussed above, if a signature is included, in some embodiments, the nonce may be unencrypted and thus block 608 would bypass decryption in lieu of signature verification. However, in other embodiments, both encryption and signature generation may be used.

As discussed above, if the method determines that the received nonce is equal to the nonce requested or generated in block 602, the method may perform a secure operation (block 508). Additionally, if the method determines that the received nonce is not equal to the nonce requested or generated in block 602, the method may either raise an error or proceed to bootstrap a public key to a computing system, as described more fully in FIG. 8.

Figure 7:
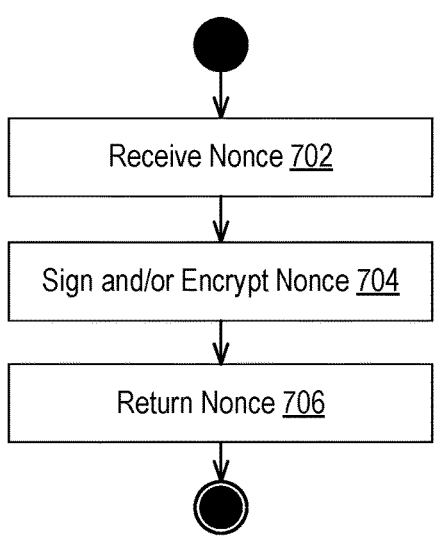
FIG. 7 is a flow diagram illustrating a method for generating an encrypted nonce by a memory device according to some embodiments of the disclosure.

FIG. 7 is a flow diagram illustrating a method for generating a nonce by a memory device according to some embodiments of the disclosure. In the illustrated embodiment, the method can be executed by a memory device.

In block 702, the method receives a nonce value. In the illustrated embodiment, the received nonce value comprises the nonce value requested or generated in block 602 of FIG. 6, the disclosure of which is incorporated in its entirety.

In block 704, the signs and/or encrypts the nonce. As discussed above, in some embodiments the method retrieves its public key and encrypts the nonce. In some embodiments, an ECDH algorithm may be used to encrypt the nonce using the private key. In the illustrated embodiment, the private key may be stored in a secure storage location of the memory device. Similar to the discussion in block 608, the memory device may alternatively, or additionally, generate a digital signature using its private key (e.g., via ECDSA). If a signature is used, decryption may be bypassed on the host processor.

In block 706, the method returns the nonce. In the illustrated embodiment, the method may receive and return the nonce over an interface such as an SPI interface. If the method generates a signature in block 704, the method will further transmit the signature in block 706 along with the (encrypted or unencrypted) nonce.

Figure 8:
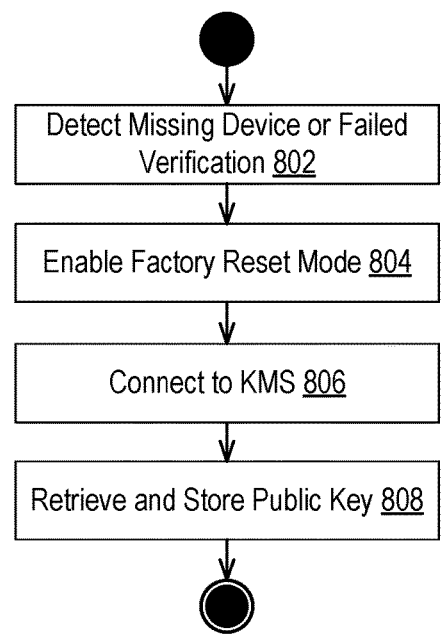
FIG. 8 is a flow diagram illustrating a method for initializing a public key according to some embodiments of the disclosure.

FIG. 8 is a flow diagram illustrating a method for initializing a public key according to some embodiments of the disclosure. In the illustrated embodiment, the method can be executed by a computing system.

In block 802, the method detects a missing device of a failed decryption.

In one embodiment, the method can query the interface (e.g., SPI interface) to determine if a memory device is connected to the computing system. In one embodiment, this querying may be done in response to a request to perform an operation (e.g., block 502). Alternatively, or in conjunction with the foregoing, the querying may be performed upon startup of the computing system or at regular intervals.

Alternatively, or in conjunction with the foregoing, the method may also detect a failed decryption attempt. In one embodiment, this attempt corresponds to the decryption performed in block 608. In this embodiment, the memory device may be connected to the computing system, but the private key of the memory device and the public key of the computing system do not match.

Notably, the system may detect a failed decryption when a new user wishes to use the computing system. In this scenario, the previous user may disconnect their memory device, and the new user (and thus new private key) may connect their memory device. Since the computing system will still have the previous user's public key, future decryption operations will fail.

In block 802, the method enables a factory reset mode in response to detecting a missing memory or in response to a failed decryption. In one embodiment, the factory reset mode may disable all user-facing features of the computing system or may otherwise prevent operations that are not explicitly required during a factory reset mode. In other words, the computing system disables all functionality non-essential to completing the factory reset procedure.

In block 804, the method connects to a KMS. In one embodiment, the KMS manages keys for users. In the illustrated embodiment, the computing system may prompt the user for a desired public key. Since public keys are not secret, the user may simply specify a username, email address, or another identifier. Thus, in some embodiments, the user will identify the desired public key to store on the computing system.

In block 806, the method retrieves and stores the desired public key. As discussed previously, the computing system may store the returned public key in a designated area of the computing device.

In one embodiment, the foregoing methods in FIGS. 6 through 8 may be used to authorize a user to a computing system. Specifically, in one embodiment, a memory device with a desired private key may be connected to the computing device. The computer system would then request the public key to authenticate the user. If the user uses the corresponding public key, the methods succeed and may unlock the computing system. If the user uses the wrong public key, the method fails and prevents access to the computing system.

In another embodiment, the foregoing methods may be used to simulate a "key" to the computing system. In this embodiment, the public key of the computing system may be hardwired or otherwise unchangeable by a user. For example, a corporate information technology (IT) department may write public keys to computing systems. The computing system may require the connection of a memory device to the computing system prior to operating. If the user connects a memory device (e.g., Flash drive) having the corresponding private key, the methods succeed and may unlock the computing system. Otherwise, the computing system may deny access to the user.

In some embodiments, in the foregoing embodiments, the public key may be permanently stored in the computing system until removed. In other embodiments, the public key may be stored in memory or otherwise temporarily stored and thus removed upon a power off or other manual requests.

To illustrate the operation of FIGS. 6-8 the following non-limiting example is provided. In an initial state, a user (Alice) may connect their memory device (e.g., portable Flash drive) to a computing system (e.g., laptop). Eventually, Alice may remove her memory device from the computing system. A second user (Bob) may then attempt to logon to the computing system. First, Bob may connect his own valid memory device to the computing system. In block 802, the computing system attempts to decrypt a nonce and fails, thus prompting Bob to provide his public key (key$_{bob}$). In one embodiment, Bob provides his username or email and the computing system downloads the public key from a KMS. The computing system then retries the nonce encryption/decryption procedure in FIG. 6 and successfully decrypts the nonce. Thus, the computing system knows that the owner of the memory device (Bob) has properly authenticated himself. Next, Bob may remove his memory device and a third user (Chuck) may attempt to log into the computing system. However, Chuck may utilize a stolen memory device and thus Chuck is not aware of which private key (key$_{stolen}$) is on the device. While executing FIG. 8, the computing system attempts to decrypt the ciphertext encrypted with key$_{stolen}$, which key$_{bob}$, which triggers the connection to the KMS. Chuck would then be required to provide the proper public key (via username, email, etc.) and is thus thwarted from accessing the computer system.

Figure 9:
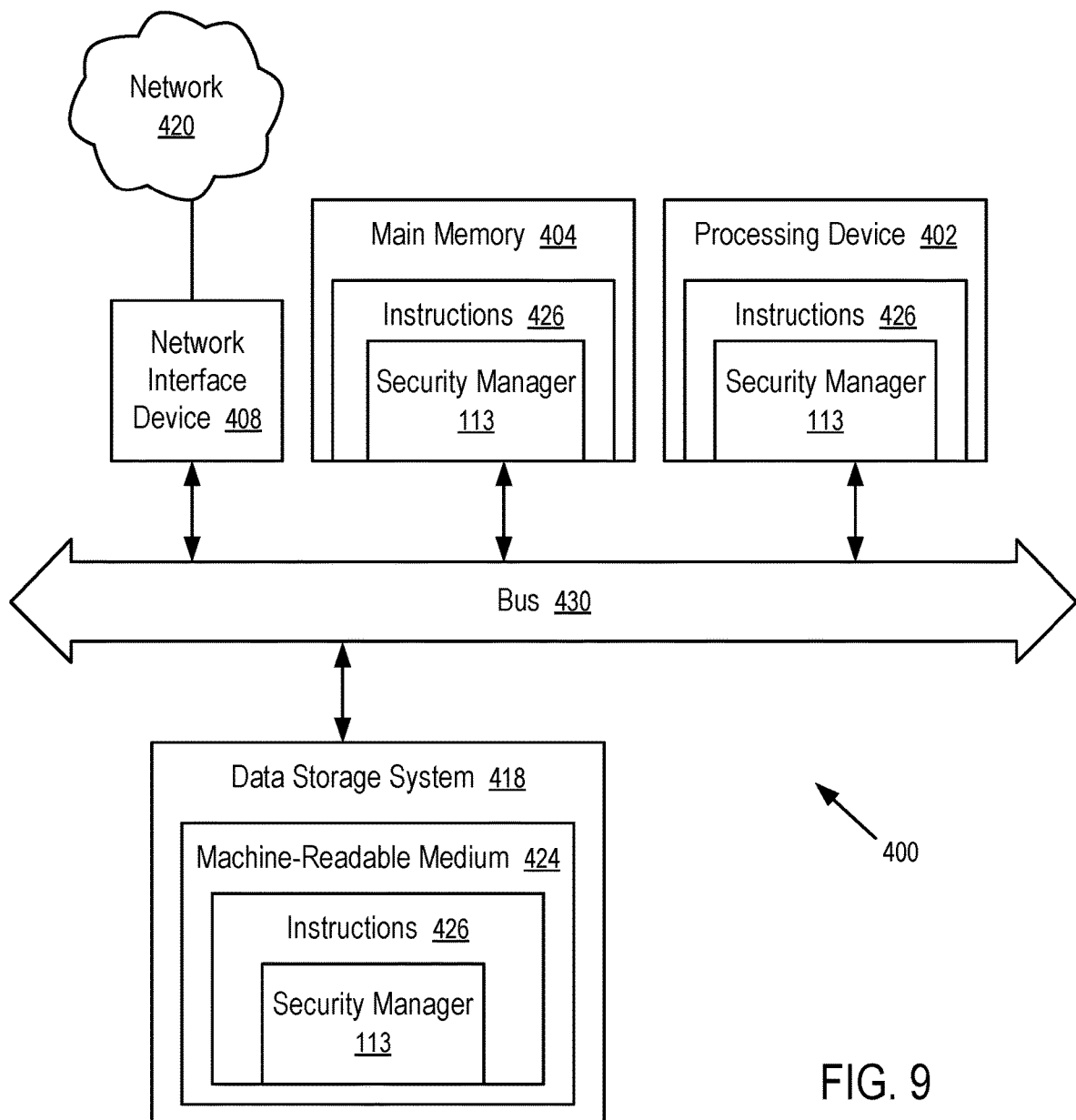
FIG. 9 is a block diagram of an example computer system in which embodiments of the present disclosure can operate.

FIG. 9 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a security manager 113 (e.g., to execute instructions to perform operations corresponding to the security manager 113 described with reference to FIGS. 1-8). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a security manager 113 (e.g., the security manager 113 described with reference to the preceding Figures). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, at a processor of a computing system, a request to perform an operation, the operation accessing a component of the computing system;
transmitting, by the processor, a nonce to a memory device communicatively coupled to the processor over a memory bus;
receiving, by the processor, a second nonce from the memory device over the memory bus, the second nonce encrypted using a first public key stored by the memory device;
verifying, by the processor, the second nonce by decrypting the encrypted second nonce using a stored public key equal to the first public key; and
executing, by the processor, the operation upon successfully verifying the second nonce.

2. The method of claim 1, wherein verifying the second nonce using a stored public key comprises verifying a digital signature associated with the second nonce, the digital signature generated by the memory device using a private key corresponding to the public key.

3. The method of claim 1, further comprising disallowing, by the computing system, the operation upon unsuccessfully verifying the second nonce.

4. The method of claim 1, further comprising entering, by the computing system, a factory reset mode in response to determining that one or more of a failed decryption of missing device condition has occurred.

5. The method of claim 4, further comprising connecting, by the computing system, to a key management server and downloading a second public key.

6. The method of claim 1, wherein transmitting the nonce to the memory device comprises transmitting the nonce to a Flash storage device.

7. A device comprising:
a processor; and
a storage medium for tangibly storing thereon program logic for execution by the processor, the stored program logic comprising:
logic, executed by the processor, for receiving a request to perform an operation, the operation accessing a component of a computing system,
logic, executed by the processor, for transmitting a nonce to a memory device communicatively coupled to the processor over a memory bus,
logic, executed by the processor, for receiving a second nonce from the memory device over the memory bus, the second nonce encrypted using a first public key stored by the memory device,
logic, executed by the processor, for verifying the second nonce by decrypting the encrypted second nonce using a stored public key equal to the first public key, and
logic, executed by the processor, for executing the operation upon successfully verifying the second nonce.

8. The device of claim 7, the program logic further comprising logic, executed by the processor, for signing the nonce prior to issuing the request to the memory device.

9. The device of claim 7, the program logic further comprising logic, executed by the processor, for disallowing the operation upon unsuccessfully verifying the second nonce.

10. The device of claim 7, the program logic further comprising entering a factory reset mode in response to determining that one or more of a failed decryption of missing device condition has occurred.

11. The device of claim 10, the program logic further comprising logic, executed by the processor, for connecting to a key management server and downloading a second public key.

12. A non-transitory computer-readable storage medium for tangibly storing computer program instructions capable of being executed by a computer processor, the computer program instructions defining the steps of:
receiving a request to perform an operation, the operation accessing a component of a computing system;
transmitting a nonce to a memory device communicatively coupled to the computer processor over a memory bus;
receiving a second nonce from the memory device over the memory bus, the second nonce encrypted using a first public key stored by the memory device;
verifying the second nonce by decrypting the encrypted second nonce using a stored public key equal to the first public key; and
executing the operation upon successfully verifying the second nonce.

13. The non-transitory computer-readable storage medium of claim 12, the computer program instructions further defining the step of signing the nonce prior to issuing the request to the memory device.

14. The non-transitory computer-readable storage medium of claim 12, the computer program instructions further defining the step of disallowing the operation upon unsuccessfully verifying the second nonce.

15. The non-transitory computer-readable storage medium of claim 12, the computer program instructions further defining the step of entering a factory reset mode in response to determining that one or more of a failed decryption of missing device condition has occurred.

16. The non-transitory computer-readable storage medium of claim 15, the computer program instructions further defining the step of connecting to a key management server and downloading a second public key.

* * * * *